US012533275B2

(12) United States Patent
Brink

(10) Patent No.: US 12,533,275 B2
(45) Date of Patent: Jan. 27, 2026

(54) MOTORIZED PATIENT TRANSFER DEVICE

(71) Applicant: Sean Brink, Albert Lea, MN (US)

(72) Inventor: Sean Brink, Albert Lea, MN (US)

( * ) Notice: Subject to any disclaimer, the term of this patent is extended or adjusted under 35 U.S.C. 154(b) by 520 days.

(21) Appl. No.: 18/183,260

(22) Filed: Mar. 14, 2023

(65) Prior Publication Data

US 2023/0414429 A1 Dec. 28, 2023

Related U.S. Application Data

(60) Provisional application No. 63/355,112, filed on Jun. 24, 2022.

(51) Int. Cl.
*A61G 7/10* (2006.01)

(52) U.S. Cl.
CPC ......... *A61G 7/1076* (2013.01); *A61G 7/1017* (2013.01); *A61G 7/1019* (2013.01); *A61G 7/1048* (2013.01); *A61G 7/1059* (2013.01); *A61G 7/1098* (2013.01)

(58) Field of Classification Search
CPC .. A61G 7/1017; A61G 7/1019; A61G 7/1046; A61G 7/1048; A61G 7/1059; A61G 7/1076; A61G 7/109; A61G 7/1092; A61G 7/1098
See application file for complete search history.

(56) References Cited

U.S. PATENT DOCUMENTS 3,222,029 A 12/1965 Hildemann
4,144,713 A 3/1979 Clark
4,296,509 A 10/1981 Simmons
5,112,076 A * 5/1992 Wilson ................. A61G 5/0875 5/81.1 R
5,411,044 A * 5/1995 Andolfi .................... A61H 3/04 414/921
5,502,851 A * 4/1996 Costello ................... A61H 3/04 5/89.1
5,644,805 A * 7/1997 Horcher ............... A61G 7/1046 5/86.1
5,758,371 A * 6/1998 VanDyke ............. A61G 7/1092 74/498
5,878,450 A * 3/1999 Bouhuijs .............. A61G 7/1017 5/83.1
5,892,180 A * 4/1999 Carey .................. A61G 7/1096 177/144
5,960,909 A * 10/1999 Horcher ............... A61G 7/1019 187/200
5,996,150 A * 12/1999 Blevins ................ A61G 7/1046 177/144
6,289,534 B1 * 9/2001 Hakamiun ........... A61G 7/1046 5/89.1

(Continued)

*Primary Examiner* — Jeffrey J Restifo
(74) *Attorney, Agent, or Firm* — Brennan, Manna & Diamond, LLC

(57) ABSTRACT

The present invention relates to a motorized patient transfer device used for transferring bedridden patients. The device is primarily comprised of a base with at least one wheel, at least one tower, at least one tower covering, at least one support arm, at least one seat, at least one footrest, and at least one motor. The support arm, footrest, and seat can be positioned over or near a hospital bed such that a bedridden patient can then be transferred to the seat in a seated position. Then, the device can be rotated from over and/or away from the bed to easily transfer the patient to a chair or other location.

20 Claims, 6 Drawing Sheets

(56) References Cited

U.S. PATENT DOCUMENTS

| | | | | |
|---|---|---|---|---|
| 6,367,103 | B1 * | 4/2002 | Collins | A61G 7/1051 5/83.1 |
| 6,581,222 | B1 * | 6/2003 | Liljedahl | A61G 7/1046 5/89.1 |
| 6,806,430 | B2 * | 10/2004 | Downing | G01G 19/44 177/144 |
| 6,938,285 | B2 * | 9/2005 | Fernie | A61G 7/1017 5/81.1 R |
| 7,356,858 | B2 * | 4/2008 | Summers | A61G 7/1096 5/89.1 |
| 7,434,278 | B2 * | 10/2008 | White | A61G 7/001 5/81.1 R |
| 7,540,045 | B2 * | 6/2009 | Nativ | A61H 3/04 5/89.1 |
| 7,716,759 | B2 * | 5/2010 | Wilder | A61G 7/1059 5/83.1 |
| 7,802,328 | B2 * | 9/2010 | Lingegard | A61G 7/1078 5/89.1 |
| 7,827,630 | B2 * | 11/2010 | Bostelman | A61G 7/1088 5/83.1 |
| 8,316,480 | B2 * | 11/2012 | Burak, Jr. | A61G 7/1057 5/81.1 HS |
| 8,621,684 | B2 * | 1/2014 | Okumatsu | A61G 7/1017 5/81.1 R |
| 8,656,529 | B2 | 2/2014 | Corriveau | |
| 10,238,562 | B2 * | 3/2019 | Pirio | A61G 7/1044 |
| 10,874,565 | B2 * | 12/2020 | Eriksson | A61G 5/14 |
| 11,607,360 | B2 * | 3/2023 | Vatti | A61G 7/1076 |
| 11,771,606 | B2 * | 10/2023 | Waskowicz | A61H 3/04 280/200 |
| 2006/0048297 | A1 * | 3/2006 | Mills | A61G 7/1067 5/86.1 |
| 2009/0165203 | A1 * | 7/2009 | Biersteker | A61G 5/14 5/83.1 |
| 2009/0165204 | A1 * | 7/2009 | Biersteker | A61G 7/1096 5/87.1 |
| 2010/0031439 | A1 * | 2/2010 | Spidare | A61G 7/1017 5/87.1 |
| 2010/0154117 | A1 * | 6/2010 | Odashima | A61G 7/1059 5/87.1 |
| 2010/0224841 | A1 * | 9/2010 | Liljedahl | B66C 13/22 254/120 |
| 2011/0056019 | A1 * | 3/2011 | Altena | A61G 7/1053 5/87.1 |
| 2012/0255118 | A1 * | 10/2012 | Hammond | A61G 7/1096 5/86.1 |
| 2013/0263374 | A1 * | 10/2013 | Yamaguchi | A61G 7/1046 5/87.1 |
| 2023/0414429 | A1 * | 12/2023 | Brink | A61G 7/1059 |

* cited by examiner

MOTORIZED PATIENT TRANSFER DEVICE

CROSS-REFERENCE TO RELATED APPLICATION

The present application claims priority to, and the benefit of, U.S. Provisional Application No. 63/355,112, which was filed on Jun. 24, 2022, and is incorporated herein by reference in its entirety.

FIELD OF THE INVENTION

The present invention relates generally to the field of patient transfer devices. More specifically, the present invention relates to a motorized patient transfer device primarily comprised of a base with at least one wheel, at least one tower, at least one tower covering, at least one support arm, at least one seat, at least one footrest, and at least one motor. The support arm, footrest, and seat can be positioned over or near a hospital bed. A bedridden patient can then be transferred to the seat in a seated position, such that the device can then be rotated from over and/or away from the bed to easily transfer the patient to a chair or other location. Accordingly, the present disclosure makes specific reference thereto. Nonetheless, it is to be appreciated that aspects of the present invention are also equally applicable to other like applications, devices, and methods of manufacture.

BACKGROUND

Transferring or moving bedridden patients in a medical setting can be exceptionally difficult, especially without several people to help. This is because nurses and caregivers may be unable to properly support the patient's weight and therefore require others to help the patient get clean or go to the bathroom. Hover-style harnesses exist in the art to aid in a patient being moved. However, hover-style harnesses can be difficult to operate and may not offer stability for the patient. In addition, hover-style harnesses still require physical assistance to move the patient.

Therefore, there exists a long-felt need in the art for an improved device for transferring or moving bedridden patients. There also exists a long-felt need in the art for a motorized patient transfer device that allows a patient to be easily moved from a hospital bed to a chair, commode, or other location. In addition, there exists a long-felt need in the art for a motorized patient transfer device that allows a patient to be easily moved that does not require physical exertion on the part of the operator.

The subject matter disclosed and claimed herein, in one embodiment thereof, comprises a motorized patient transfer device. The device is primarily comprised of a base with at least one wheel, at least one tower, at least one tower covering, at least one support arm, at least one seat, at least one footrest, and at least one motor. The support arm, footrest, and seat can be positioned over or near a hospital bed. A bedridden patient can then be transferred to the seat in a seated position, wherein the underarms of the patient are supported by the support arm. The device can then be rotated from over and/or away from the bed to easily transfer the patient to a chair or other location.

In this manner, the motorized patient transfer device of the present invention accomplishes all of the foregoing objectives and provides an improved device for transferring or moving bedridden patients. During use, the device allows a patient to be easily moved from a hospital bed to a chair, commode, or other location without requiring physical exertion on the part of the operator.

SUMMARY

The following presents a simplified summary to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a motorized patient transfer device primarily comprised of a base with at least one wheel, at least one tower, at least one tower covering, at least one support arm, at least one seat, at least one footrest, and at least one motor. The base is preferably generally x-shaped with at least two (but preferably four) legs. Each leg is comprised of at least one axle located above, below, or through the leg. At least one wheel rotates 360 degrees around the axle.

The base is comprised of at least one rotating tower base, wherein at least one tower is fixedly or removably attached to the rotating tower base and is perpendicular to the base. The tower base can rotate 360 degrees relative to its vertical axis via at least one motor such that the tower also rotates in this manner. The tower has at least one, but preferably two channels. The tower covering is positioned around the tower and is comprised of at least one interior wheel assembly. The wheel assembly is comprised of at least one wheel that is captured within the channel. In this manner, the motor can vertically raise and lower the tower covering on the tower via at least one motorized track or another similar mechanism of the like.

The tower covering is also comprised of at least one vertical track, wherein at least one support arm and at least one footrest attach to the vertical track. In one embodiment, the footrest and the support arm can move independently or simultaneously upward and downward on the track via the motor.

In the preferred embodiment, the device has two support arms that may be parallel to one another (or in one embodiment, non-parallel) and perpendicular to the track. The support arms may be comprised of a padding to remain comfortable as a patient is transported on the device with one support arm under each arm of the patient. The arms may be fixed in position or may attach to the track via at least one hinge such that the arms can fold when not in use. Similarly, the footrest may fixedly attach to the track in one embodiment. In another embodiment, the footrest may attach to the track via at least one hinge that allows the footrest to fold when not in use. At least one seat is suspended between the arms via at least one strap.

The device can be positioned and rotated near a hospital bed such that a bedridden patient can sit (or be placed in a sitting position) on the device. Then, the device can be rotated away from the bed to place the patient into a chair, commode, or other location. When not in use, the support arms can be folded, and the device can be easily stored.

Accordingly, the motorized patient transfer device of the present invention is particularly advantageous as it provides an improved device for transferring or moving bedridden patients without requiring physical exertion on the part of the operator. In this manner, the motorized patient transfer device overcomes the limitations of existing patient transfer methods and devices known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
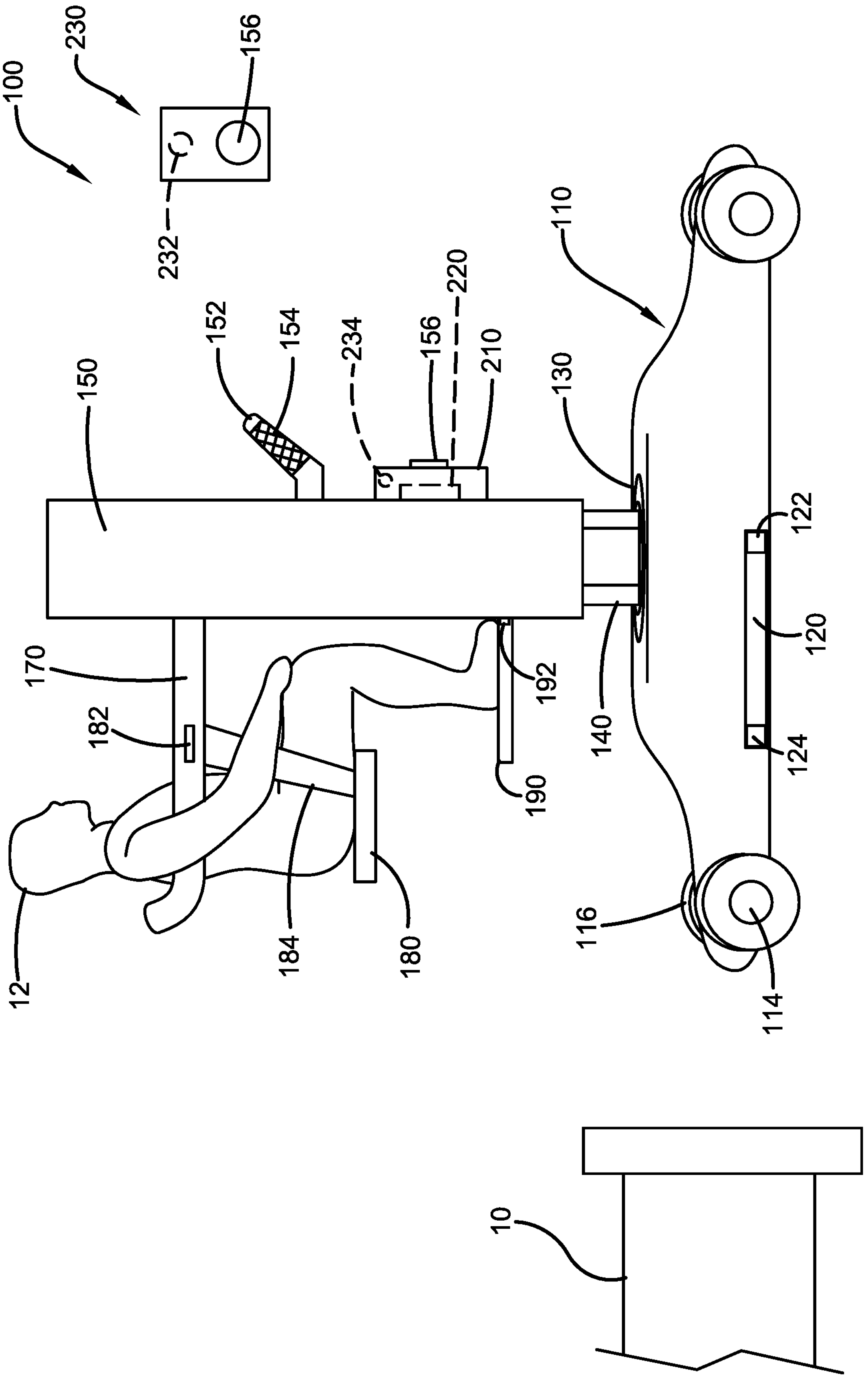
FIG. 1 illustrates a side view of one potential embodiment of a motorized patient transfer device of the present invention while being used by a patient in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an improved device for transferring or moving bedridden patients. There also exists a long-felt need in the art for a motorized patient transfer device that allows a patient to be easily moved from a hospital bed to a chair, commode, or other location. In addition, there exists a long-felt need in the art for a motorized patient transfer device that allows a patient to be easily moved that does not require physical exertion on the part of the operator.

Referring initially to the drawings, FIG. 1 illustrates a side view of one potential embodiment of a motorized patient transfer device 100 of the present invention while being used by a patient in accordance with the disclosed architecture. The device 100 is primarily comprised of a base 110 with at least one wheel 116, at least one tower 140, at least one tower covering 150, at least one support arm 170, at least one seat 180, at least one footrest 190, and at least one motor 210. Unless otherwise specified herein, all components of the device 100 are preferably made from a durable metal such as, but not limited to, stainless steel, aluminum, etc., or a rigid plastic such as, but not limited to, acrylic, polycarbonate, polyethylene, thermoplastic, acrylonitrile butadiene styrene, low-density polyethylene, medium-density polyethylene, high-density polyethylene, polyethylene terephthalate, polyvinyl chloride, polystyrene, polylactic acid, acetal, nylon, fiberglass, recycled plastic, biodegradable plastic, etc. The base 110 may be any shape in differing embodiments. However, in the preferred embodiment, the base 110 is generally x-shaped with at least two (but preferably four) legs 112.

Each leg 112 is comprised of at least one axle 114 located above, below, or through the leg 112. The axle 114 may be a vertical or horizontal axle in differing embodiments. At least one wheel 116 rotates 360 degrees around the axle 114. The wheel 116 allows the base 110 to be rolled/move easily. The wheel 116 may be any wheel-wheel type in the art such as, but not limited to, a locking wheel, a faster wheel, an inflatable wheel, etc.

Figure 2:
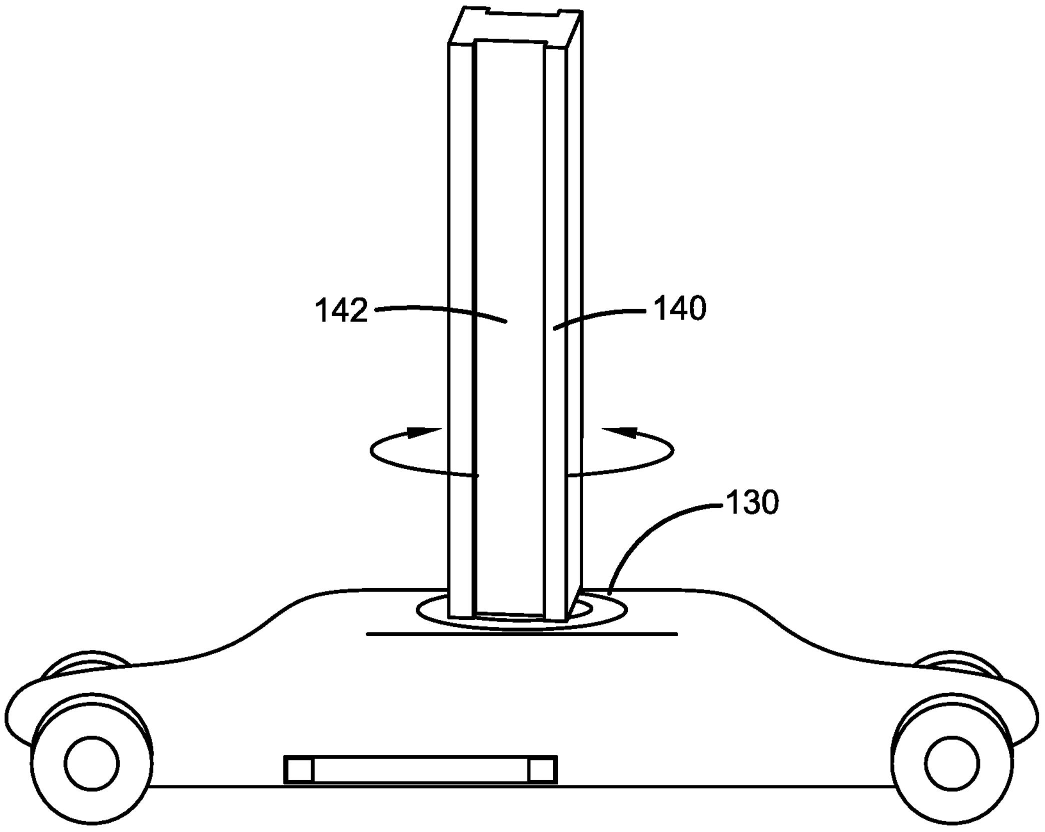
FIG. 2 illustrates a perspective view of a tower of one potential embodiment of a motorized patient transfer device of the present invention in accordance with the disclosed architecture.

As seen in FIG. 2, the base 110 is comprised of at least one rotating tower base 130. At least one tower 140 is fixedly or removably attached to the rotating tower base 130 and is perpendicular to the base 110. The base 130 can rotate 360 degrees relative to its vertical axis via at least one motor 210 such that the tower 140 also rotates in this manner.

The tower 140 has at least one, but preferably two channels 142. In the preferred embodiment, the tower 140 is generally rectangular such that together with the channels 142, the tower 140 has the general shape of an I-Beam. However, the tower 140 may be any shape in differing embodiments. Further, the channel 142 may be positioned in any arrangement on the tower 140.

Figure 3:
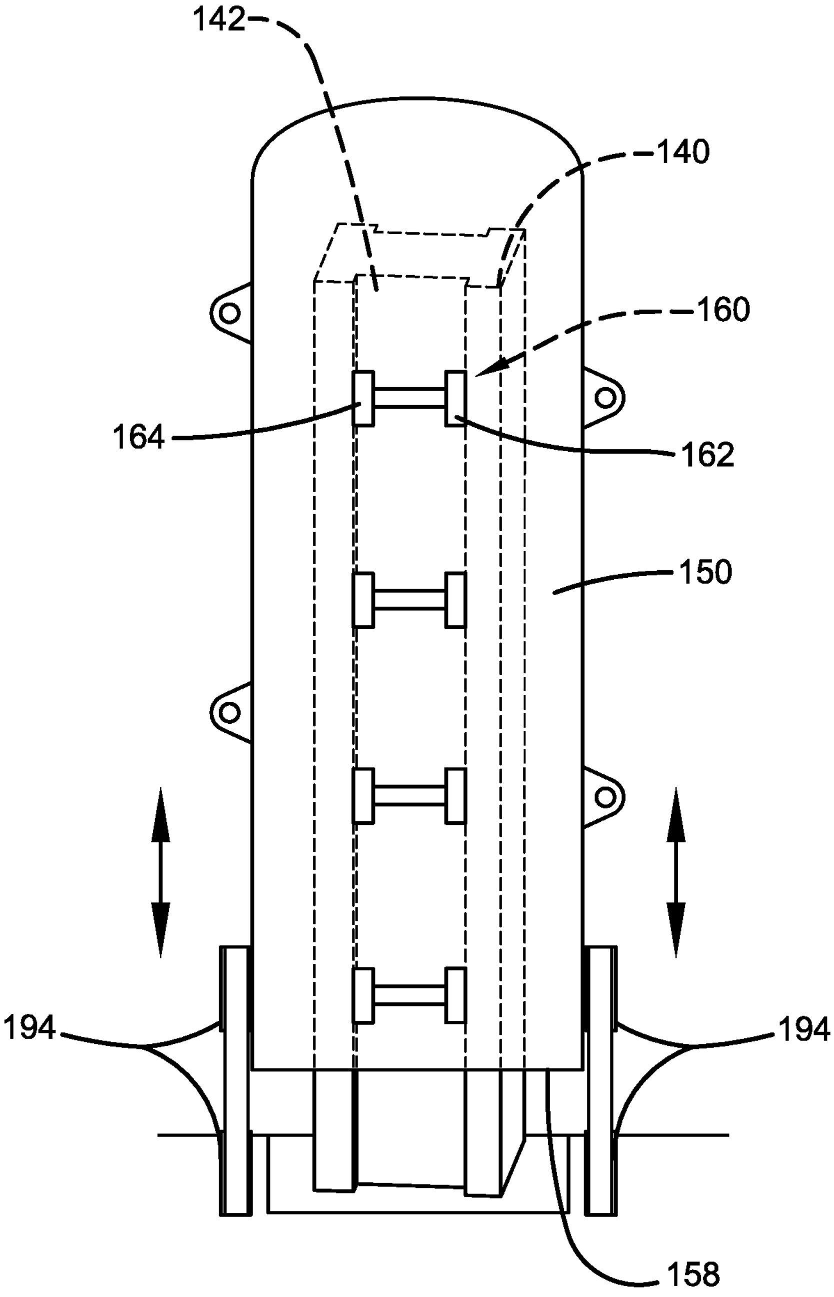
FIG. 3 illustrates a perspective view of a tower and tower covering of one potential embodiment of a motorized patient transfer device of the present invention in accordance with the disclosed architecture.

As best seen in FIG. 3, the tower covering 150 is positioned around the tower 140 and may be removably or fixedly attached to the tower 140. The tower covering 150 may also be comprised of at least one handle 152 that allows the entire device 100 to be pushed and moved as needed. The handle 152 may have at least one grip area 154. The grip area 154 may be textured with a recessed or raised texture or may be non-textured. The grip area 154 is preferably made from a non-slip material such as, but not limited to, silicone, latex, neoprene, EPDM, PVC foam, polyethylene, sponge rubber, silicone foam, urethane, cork, ridged and/or recessed rubber, felt, acrylic, polyester & SBR, etc.

The tower covering 150 is comprised of at least one interior wheel assembly 160. The wheel assembly 160 is comprised of at least one wheel 162. However, in the preferred embodiment, the wheel assembly 160 is comprised of two parallel wheels 162 connected by at least one cross member 164. The cross member 164 is fixedly or removably attached to the interior surface 158 of the tower covering 150. The wheels 162 are preferably captured within the channel 142. In this manner, the motor 210 can vertically raise and lower the tower covering 150 on the tower 140 via at least one motorized track 194 or another similar mechanism of the like. The track 194 may be on the interior or exterior of the cover 150.

Figure 4:
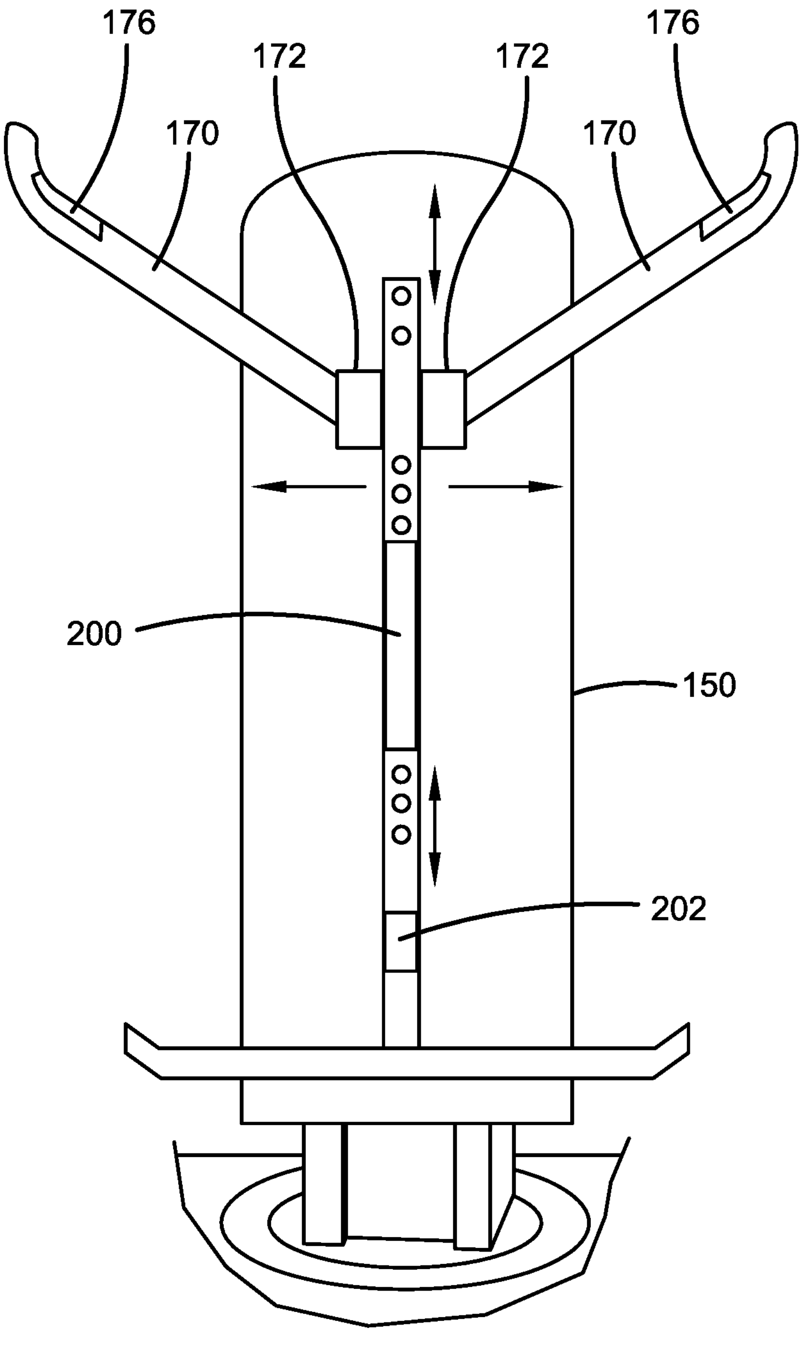
FIG. 4 illustrates a perspective view of a tower covering of one potential embodiment of a motorized patient transfer device of the present invention in accordance with the disclosed architecture.

As seen in FIG. 4, the tower covering 150 is also comprised of at least one vertical track 200. At least one support arm 170 and at least one footrest 190 attach to the vertical track 200 and can independently or simultaneously move upward and downward on the track 200 via the motor 210.

In the preferred embodiment, the device 100 has two support arms 170 that may be parallel to one another (or in one embodiment, non-parallel) and perpendicular to the track 200. The support arms 170 may be comprised of a padding 176 to remain comfortable as a user 10 is transported on the device 100 with one support arm 170 under each arm of the patient. The padding 176 may be, but is not limited to, a foam padding such as, but not limited to, a charcoal foam, a closed cell foam, a dry fast foam, a high-density foam, a high-resilience foam, a latex foam, a lux foam, a memory foam, a polyurethane foam, a rebond foam, a waterproof foam, etc.

In one embodiment, the arms 170 are fixed in position. In a differing embodiment, each arm 170 attaches to the track 200 via at least one hinge 172. In this manner, the arms 170 can fold when not in use. The hinge 172 may be any hinge type known in the art such as, but not limited to, an offset blind hinge, a knuckle hinge, a butt hinge, a rising butt hinge, a gravity pivot hinge, a ball bearing hinge, a barrel hinge, a concealed hinge, a knife hinge, a piano hinge, a strap hinge, a pivot hinge, a gas-piston hinge, an injection molded hinge, a locking hinge, a motorized hinge, etc.

At least one seat 180 is suspended between the arms 170 via at least one strap 184. Each strap 184 may be attached to the seat 180 and attached to each arm 170 via at least one fastener 182. The fastener 182 may be any type known in the art such as, but not limited to, a clip, a hook, etc. The seat 180 is preferably made from any fabric material known in the art.

The footrest 190 may fixedly attach to the track 200 in one embodiment. In another embodiment, the footrest 190 may attach to the track via at least one hinge 192 that allows the footrest 190 to fold when not in use.

It should be appreciated that in one embodiment, the arms 170 and footrest 190 are both fixedly attached to the track 200, such that the footrest 190 and arms 170 are always a fixed distance apart, even as both arms 170 and the footrest 190 move up and down on the track 200. In a differing embodiment, both arms 170 and the footrest 190 are separately attached to the track 200 via at least one mounting plate 202 or other similar means known in the art. The plates 202 allow the footrest 190 to be moved independently along the track 200 relative to both arms 170, and vice versa.

Figure 5:
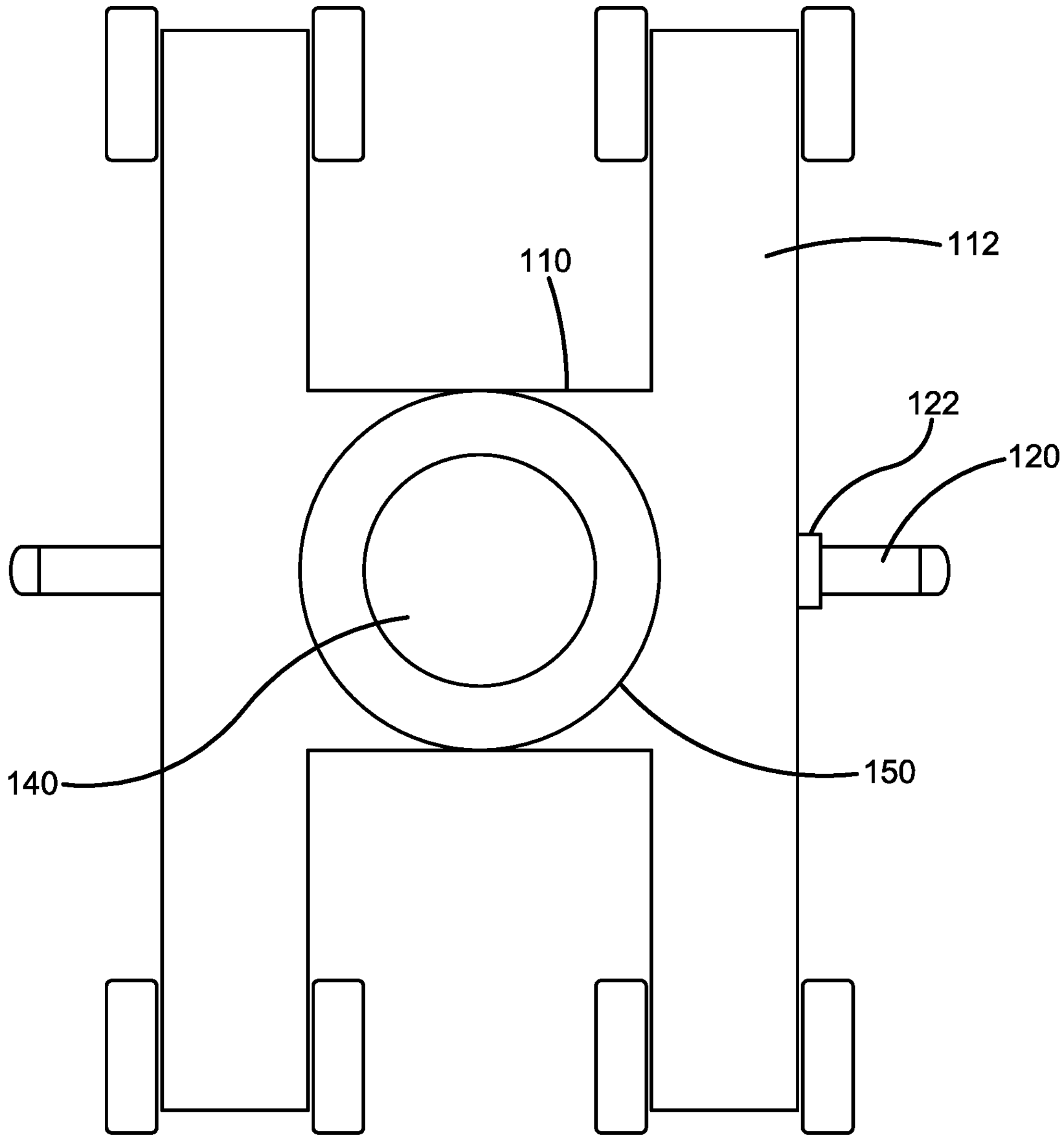
FIG. 5 illustrates a top view of a tower of one potential embodiment of a motorized patient transfer device of the present invention with outriggers extended in accordance with the disclosed architecture.

The base 110 is further comprised of at least one outrigger support 120 attached to the base 110 via at least one hinge 122, as seen in FIG. 5. The outrigger support 120 can be extended from the base 110 via the motor 210 (in an embodiment where the hinge 122 is motorized) or manually extended such that it contacts the ground surface via a non-slip foot 124 to further support the device 100 and distribute the weight of a patient during patient transfer.

The tower covering 150 is also comprised of at least one button 156. The button 156 is used to control the motor 210. As a result, the button 156 allows a user to control the motor 210 to rotate the rotating tower base 130, to raise/lower the tower covering 150 on the tower 140, to move the track 200 up/down to raise/lower the support arms 170 and footrest 190, turn the motor 210 on/off, fold the arms 170 and/or footrest 190 in an embodiment wherein the hinges 172,192 are motorized, extend, or fold the outrigger support 120, etc.

In one embodiment, the motor 210 may be controlled by at least one remote 230. At least one transmitter 232 of the remote 230 is in wireless electrical communication with at least one receiver 234 of the motor 210. In a different embodiment, the remote 230 is in wired connection with the motor 210.

The motor 210 may be any electric motor or other motor type known in the art. The motor 210 is powered by at least one battery 220. The battery 220 may be a disposable battery 220 or a rechargeable battery 220 in the form of an alkaline, nickel-cadmium, nickel-metal hydride battery 220, etc., such as any 3V-12 volts DC battery 220 or other conventional battery 220 such as A, AA, AAA, etc., that supplies power to the device 100. Throughout this specification, the terms “battery” and “batteries” may be used interchangeably to refer to one or more wet or dry cells or batteries 220 of cells in which chemical energy is converted into electricity and used as a source of DC power. References to recharging or replacing batteries 220 may refer to recharging or replacing individual cells, individual batteries 220 of cells, or a package of multiple battery cells as is appropriate for any given battery 220 technology that may be used.

Figure 6:
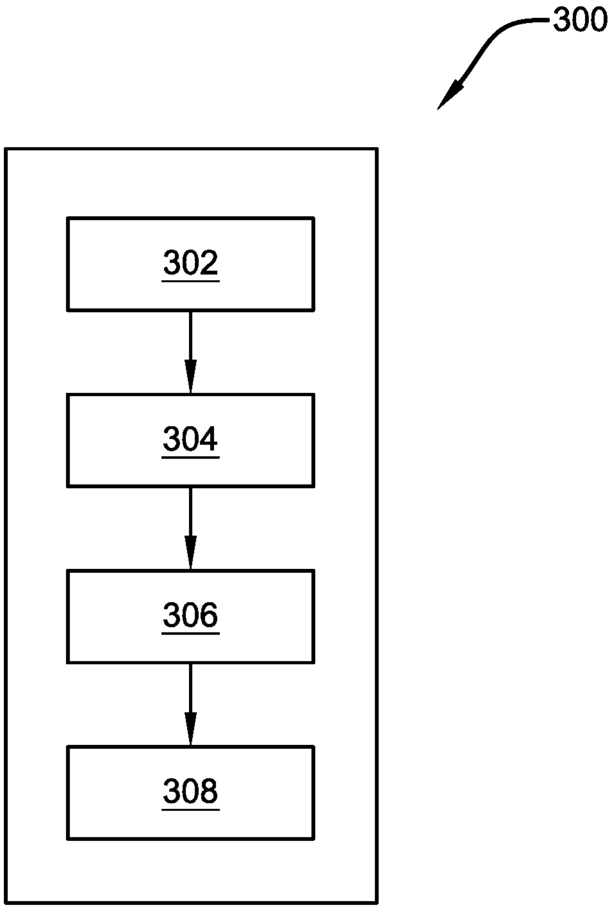
FIG. 6 illustrates a flowchart of a method of using one potential embodiment of a motorized patient transfer device of the present invention to move a patient in accordance with the disclosed architecture.

FIG. 6 illustrates a flowchart of a method 300 of using one potential embodiment of a motorized patient transfer device 100 of the present invention to move a patient 12 in accordance with the disclosed architecture. The device 100 is also comprised of a method of use 300. First, the device 100 is positioned near a hospital bed 10 [Step 302]. Then, the tower covering 150 can be raised or lowered on the tower 140 [Step 304]. Then, the arms 170, seat 180, and footrest 190 can be adjusted as needed along the track 200 and the tower base 130 can be rotated over/near a hospital bed 10 to allow a patient 12 to sit on the device 100 such that the patient’s 12 underarms are supported by each support arm 170, the patient’s 12 buttocks is supported by the seat 180, and the patient’s feet are supported by the footrest 190 [Step 306]. Next, the base 130 can be rotated such that the patient 12 is transferred from the hospital bed 10 to a chair, commode, or other area [Step 308].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein “motorized patient transfer device” and “device” are interchangeable and refer to the motorized patient transfer device 100 of the present invention.

Notwithstanding the foregoing, the motorized patient transfer device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the motorized patient transfer device 100 as shown in the FIGS. are for illustrative purposes only, and that many other sizes and shapes of the motorized patient transfer device 100 are well within the scope of the present disclosure. Although the dimensions of the motorized patient transfer device 100 are important design parameters for user convenience, the motorized patient transfer device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A motorized patient transfer device comprising:
a base;
a rotating tower base;
a tower positioned on the rotating tower base;
a tower covering positioned over the tower;
a support arm positioned on the tower covering;
a footrest positioned on the tower covering;
a seat positioned on the tower covering;
a vertical track positioned on the tower covering;
a motor; and
a button.

2. The motorized patient transfer device of claim 1, wherein the base is comprised of an x-shape.

3. The motorized patient transfer device of claim 1, wherein the support arm is comprised of a padding.

4. A motorized patient transfer device comprising:
a base comprised of a wheel;
a rotating tower base;
a tower comprised of a channel;
a tower covering comprised of a wheel assembly;
a support arm;
a vertical track;
a footrest;
a seat;
a motor; and
a button.

5. The motorized patient transfer device of claim 4, wherein the wheel can rotate 360 degrees around an axle.

6. The motorized patient transfer device of claim 4, wherein the tower is comprised of an I-shape.

7. The motorized patient transfer device of claim 4, wherein the tower covering is comprised of a handle.

8. The motorized patient transfer device of claim 4, wherein the support arm and the footrest are attached to the vertical track.

9. The motorized patient transfer device of claim 8, wherein the support arm can move independently relative to the footrest on the vertical track.

10. The motorized patient transfer device of claim 8, wherein the footrest can move independently relative to the support arm on the vertical track.

11. A motorized patient transfer device comprising:
a base comprised of a wheel;
a rotating tower base;
a tower comprised of a channel, the tower positioned on the rotating tower base;
a tower covering comprised of a wheel assembly, the tower covering positioned on the tower;
a support arm;
a vertical track;
a footrest;
a seat;
a motor; and
a remote.

12. The motorized patient transfer device of claim 11, wherein the wheel assembly is positioned within the channel.

13. The motorized patient transfer device of claim 11, wherein the rotating tower base can rotate 360 degrees via the motor.

14. The motorized patient transfer device of claim 11, wherein the motor raises and lowers the tower covering on the tower via a motorized track.

15. The motorized patient transfer device of claim 11, wherein the support arm and the footrest are attached to the vertical track.

16. The motorized patient transfer device of claim 15, wherein the support arm is attached to the vertical track via a hinge.

17. The motorized patient transfer device of claim 15, wherein the footrest is attached to the vertical track via a mounting plate.

18. The motorized patient transfer device of claim 11, wherein the seat is attached to the support arm via a strap.

19. The motorized patient transfer device of claim 11 further comprised of an outrigger support.

20. The motorized patient transfer device of claim 19, wherein the outrigger support attaches to the base via a hinge.

* * * * *